United States Patent
Li et al.

(10) Patent No.: US 11,483,763 B2
(45) Date of Patent: Oct. 25, 2022

(54) NETWORK SLICE CONFIGURATION METHOD, FIRST NETWORK ELEMENT AND SECOND NETWORK ELEMENT

(71) Applicant: ZTE Corporation, Guangdong (CN)

(72) Inventors: Dapeng Li, Shenzhen (CN); Yin Gao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/920,025

(22) Filed: Sep. 25, 2020

(65) Prior Publication Data

US 2021/0045048 A1 Feb. 11, 2021

Related U.S. Application Data

(63) Continuation of application No. PCT/CN2018/111898, filed on Oct. 25, 2018.

(30) Foreign Application Priority Data

Jan. 10, 2018 (CN) .......................... 201810023573.4

(51) Int. Cl.
*H04L 67/00* (2022.01)
*H04W 88/08* (2009.01)
(Continued)

(52) U.S. Cl.
CPC ............ *H04W 48/18* (2013.01); *H04L 67/34* (2013.01); *H04W 24/02* (2013.01); *H04W 76/10* (2018.02)

(58) Field of Classification Search
CPC ..... H04W 48/18; H04W 76/10; H04W 24/02; H04W 12/06; H04W 28/16; H04W 48/16;
(Continued)

(56) References Cited

U.S. PATENT DOCUMENTS

2017/0303259 A1 10/2017 Lee et al.
2018/0324663 A1* 11/2018 Park .................. H04W 36/0083
(Continued)

FOREIGN PATENT DOCUMENTS

CN      106412905 A    2/2017
CN      106657194 A    5/2017
(Continued)

OTHER PUBLICATIONS

First Office Action for CN Appl. No. 201810023573.4, dated May 8, 2021 (9 pages).
(Continued)

*Primary Examiner* — Joseph E Dean, Jr.
(74) *Attorney, Agent, or Firm* — Foley & Lardner LLP (57) ABSTRACT

Provided are a network slice configuration method, a first network element and a second network element. The network slice configuration method includes: sending, by a first network element, network slice configuration information to a second network element, so that the second network element stores network slice information corresponding to the network slice configuration information; receiving, by a second network element, network slice configuration information of a first network element; and storing, by the second network element, network slice information corresponding to the network slice configuration information.

16 Claims, 7 Drawing Sheets

(51) Int. Cl.
*H04W 48/18* (2009.01)
*H04W 76/10* (2018.01)
*H04W 24/02* (2009.01)

(58) Field of Classification Search
CPC ... H04W 88/18; H04W 88/085; H04W 80/10; H04W 92/24; H04L 67/34; H04L 41/0893
See application file for complete search history.

(56) References Cited

U.S. PATENT DOCUMENTS

2019/0053193 A1* 2/2019 Park .................. H04W 76/27
2019/0141606 A1* 5/2019 Qiao .................. H04W 48/04

FOREIGN PATENT DOCUMENTS

| CN | 106937362 A | 7/2017 |
|----|-------------|--------|
| CN | 107197486 A | 9/2017 |
| CN | 107306438 A | 10/2017 |
| WO | WO-2017/119844 A1 | 7/2017 |
| WO | WO-2017/140341 A1 | 8/2017 |

OTHER PUBLICATIONS

Extended European Search Report for EP Appl. No. 18899236.6, dated Aug. 18, 2021 (10 pages).
ZTE Corporation: "NW slicing for high layer functional split" 3GPP TSG-RAN WG3 NR AdHoc; R3-180139; Jan. 26, 2018; Sophia Antipolis, France (7 pages).
First Office Action for KR Appl. No. 10-2020-7017173, dated Mar. 2, 2022 (with English translation, 12 pages).
Samsung: "On UL Power Control" 3GPP TSG RAN WG1 Meeting 90bis; R1-1717692; Oct. 13, 2017; Prague, Czech (6 pages).
International Search Report for PCT Appl. No. PCT/CN2018/111898 dated Jan. 16, 2019 (5 pages with English translation).

* cited by examiner

NETWORK SLICE CONFIGURATION METHOD, FIRST NETWORK ELEMENT AND SECOND NETWORK ELEMENT

CROSS-REFERENCE TO RELATED APPLICATIONS

This application claims the benefit of priority under 35 U.S.C. § 120 as a continuation of PCT Patent Application No. PCT/CN2018/111898, filed on Oct. 25, 2018, which, claims priority to Chinese patent application No. 201810023573.4 filed on Jan. 10, 2018, the disclosure of each of which is incorporated herein by reference in its entirety.

TECHNICAL FIELD

The present application relates to a network slicing technique, and in particular, to a network slice configuration method, a first network element, and a second network element.

BACKGROUND

In a 5th generation (5G) mobile communication, mass connections and higher rate requirements of users pose a great challenge to the transmission capacity of a common public radio interface (CPRI) in a long-term evolution (LTE) system. The CPRI is a fronthaul interface between a remote radio unit (RRU) and a building baseband unit (BBU). Because the CPRI transmits an In-phase Quadrature (IQ) signal processed by physical layer coding modulation and the like, the CPRI has higher requirements on transmission delay and bandwidth. When a 5G air interface has a rate increased to tens of Gigabyte per second (Gbps), the demand for traffic of the CPRI will reach a level of Tera Bytes per second (Tbps), which puts tremendous pressure on network deployment costs and difficulties. Therefore, in the 5G system, the division of the fronthaul interface needs to be redefined. For example, a delay-insensitive user plane function is implemented in a centralized unit (CU) and a delay-sensitive user plane function is implemented in a distributed unit (DU). The transmission between the CU and the DU is performed through an ideal and/or non-ideal fronthaul interface.

Figure 1:
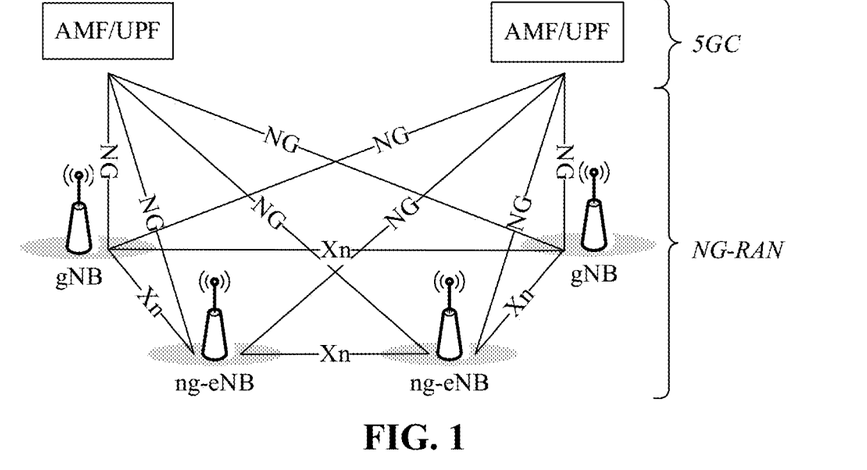
FIG. 1 is a schematic diagram of a 5G structure specified by the 3GPP TS 38.300 protocol.

FIG. 1 is a schematic diagram of a 5G structure specified by the 3GPP TS 38.300 protocol. As shown in FIG. 1, The 5G includes a 5G core network (5GC) and a 5G access network (NG-RAN). The 5G core network includes an Access and Mobility Management (AMF) network element and a User Plane Function (UPF, User Plane Function) network element, and The 5G access network includes a 4G base station (ng-eNB) or a 5G base station (gNB) connected to the 5G core network. An interface between a core network element and an access network element is an NG interface, and an interface between access network elements is an Xn interface.

Figure 2:
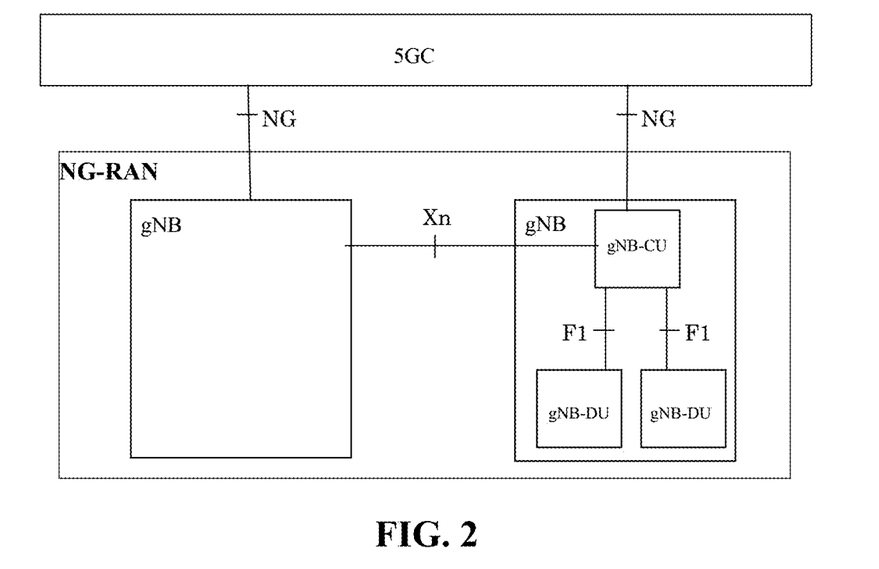
FIG. 2 is a schematic diagram of an architecture of CU-DU functionality specified by the 3GPP TS 38.401 protocol.

FIG. 2 is a schematic diagram of an architecture of CU-DU functionality specified by the 3GPP TS 38.401 protocol. As shown in FIG. 2, an interface between CUs of different access network elements is an Xn interface, an interface between a CU and a DU in an access network element is an F1 interface, and an interface between an access network and the 5G core network is an NG interface.

Figure 3:
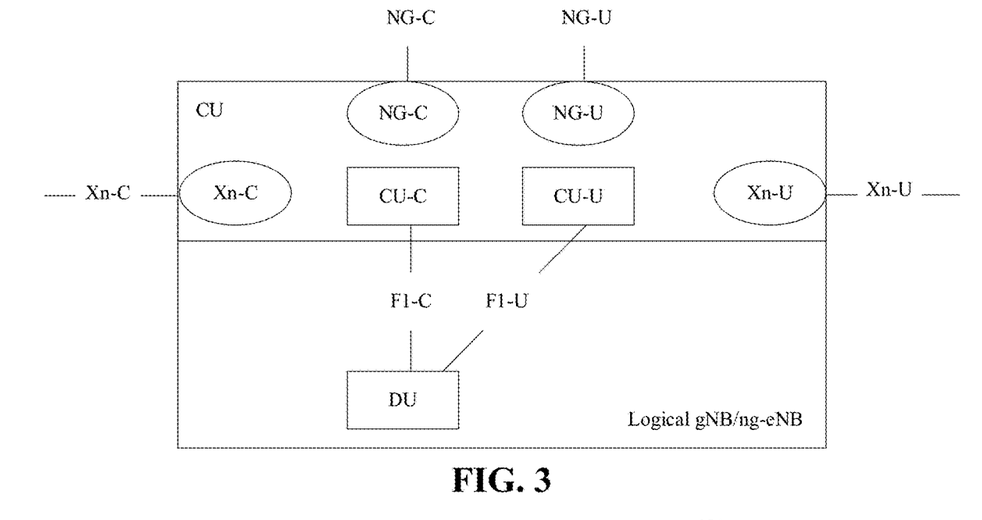
FIG. 3 is a schematic diagram of logical connections within an access network element in the related art.

FIG. 3 is a schematic diagram of logical connections within an access network element. As shown in FIG. 3, the CU is divided into a control plane CU (CU-C) and a user plane CU (CU-U), then an interface between the DU and the CU-C is an F1-C interface, an interface between the DU and the CU-U is an F1-U interface, an interface between CU-Cs of different access network elements is an Xn-C interface, an interface between CU-Us of different access network elements is an Xn-U interface, an interface between the CU-C and the core network element is an NG-C interface, and the interface between CU-U and the core network element is an NG-U interface.

In the architecture of the CU-DU function of the 5G structure described above, the core network needs to allocate corresponding resources to a terminal based on configuration of a network slice, so as to provide a service for the terminal. However, no effective method for configuring a network slice has been provided in the related art.

SUMMARY

Embodiments of the present application provide a network slice configuration method, which can implement configuration of a network slice, thereby providing a service for a terminal.

The embodiments of the present application provide a network slice configuration method. The method includes a step described below. A first network element sends network slice configuration information to a second network element, so that the second network element stores network slice information corresponding to the network slice configuration information.

In an embodiment, the method further includes a step described below. The first network element acquires the network slice configuration information.

In an embodiment, the network slice configuration information includes at least one of: network slice information, information of a network slice to which a cell belongs, information of a network slice to which a data radio bearer of a terminal belongs, information of a tracing area to which a cell belongs, or information of a network slice supported by a tracing area.

In an embodiment, the network slice information includes at least one of: single network slice selection assistance information, network slice selection assistance information or a network slice type.

In an embodiment, the network slice to which the data radio bearer of the terminal belongs and a network slice to which a data connection session corresponding to the data radio bearer belongs are one same network slice.

The embodiments of the present application further provide a network slice configuration method. The method includes steps described below. A second network element receives network slice configuration information of a first network element. The second network element stores network slice information corresponding to the network slice configuration information.

In an embodiment, the network slice configuration information includes at least one of: network slice information, information of a network slice to which a cell belongs, information of a network slice to which a data radio bearer of a terminal belongs, information of a tracing area to which a cell belongs, or information of a network slice supported by a tracing area.

In an embodiment, the network slice information includes at least one of: single network slice selection assistance information, network slice selection assistance information or a network slice type.

In an embodiment, the network slice to which the data radio bearer of the terminal belongs and a network slice to which a data connection session corresponding to the data radio bearer belongs are one same network slice.

In an embodiment, the network slice configuration information includes information of a tracing area to which a cell belongs.

The step in which the second network element stores the network slice information corresponding to the network slice configuration information includes steps described below. The second network element determines information of a network slice to which a cell belongs according to the information of the tracing area to which the cell belongs and information of a network slice supported by a tracing area, and stores the information of the network slice to which the cell belongs into cell information or information of a network slice supported by the second network element.

In an embodiment, the network slice configuration information includes information of a network slice to which a cell belongs.

The step in which the second network element stores the network slice information corresponding to the network slice configuration information includes a step described below. The second network element stores the information of the network slice to which the cell belongs into cell information or information of a network slice supported by the second network element.

In an embodiment, the network slice configuration information includes information of a network slice to which a data radio bearer of a terminal belongs.

The step in which the second network element stores the network slice information corresponding to the network slice configuration information includes a step described below. The second network element stores the network slice configuration information into a context of the terminal.

The embodiments of the present application further provide a first network element. The first network element includes a sending module.

The sending module is configured to send network slice configuration information to a second network element so that the second network element stores network slice information corresponding to the network slice configuration information.

In an embodiment, the network element further includes an acquisition module. The acquisition module is configured to acquire the network slice configuration information.

The embodiments of the present application further provide a second network element. The second network element includes a receiving module and a storing module.

The receiving module is configured to receive network slice configuration information of a first network element; and The storing module is configured to store network slice information corresponding to the network slice configuration information.

The embodiments of the present application further provide a first network element. The first network element includes a first processor and a first memory for storing a computer program executable on the first processor, where the first processor is configured to perform the steps of the network slice configuration method applied to the first network element according to the embodiments of the present application when running the computer program.

The embodiments of the present application further provide a second network element. The second network element includes a second processor and a second memory for storing a computer program executable on the second processor, where the second processor is configured to perform the steps of the network slice configuration method applied to the second network element according to the embodiments of the present application when running the computer program.

The embodiments of the present application provide a computer-readable storage medium. The computer-readable storage medium is configured to store a computer program that, when executed by a processor, implements the steps of the network slice configuration method applied in the first network element or the second network element.

According to the network slice configuration method in the embodiments of the present application, configuration of a network slice is implemented through a manner of a first network element sending network slice configuration information to a second network element, so that a service is provided for the terminal.

BRIEF DESCRIPTION OF DRAWINGS

The drawings are provided for a further understanding of the technical solutions of the present application, and constitute a part of the description. The drawings and the embodiments of the present application are used to explain the technical solutions of the present application, and not intended to limit the technical solutions of the present application.

DETAILED DESCRIPTION

The object, technical solution and advantages of the present application will be clearer from a detailed description of embodiments of the present application in conjunction with the drawings.

It is to be noted that if not in collision, the embodiments and features therein in the present application may be combined with each other.

The steps shown in the flowchart of the drawings may be performed by a computer system such as a set of computer-executable instructions. Although logical sequences are shown in the flowchart, the shown or described steps may be performed in sequences different from those described herein in some cases.

Figure 4:
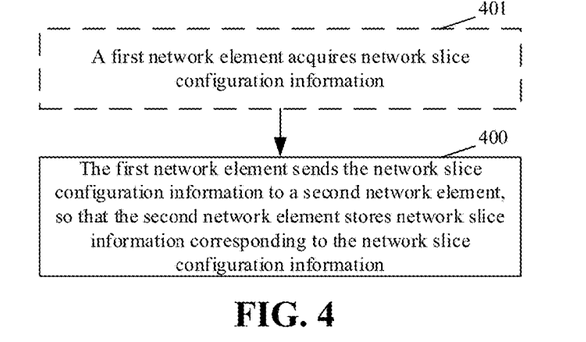
FIG. 4 is a flowchart of a network slice configuration method at a first network element side according to an embodiment of the present application.

Referring to FIG. 4, an embodiment of the present application provides a network slice configuration method. The method includes steps described below.

In step 400, a first network element sends network slice configuration information to a second network element, so that the second network element stores network slice information corresponding to the network slice configuration information.

In an embodiment of the present application, the network slice configuration information includes at least one of: network slice information, information of a network slice to which a cell belongs, information of a network slice to which a data radio bearer of a terminal belongs, information of a tracing area (TA) to which a cell belongs, or information of a network slice supported by a TA.

After the network slice is configured by this way, resources are subsequently allocated to the terminal according to the cell, thereby effectively improving mobility management capability of the terminal. For example, when a terminal needs to move from a DU under a CU to another DU, the CU may switch the terminal to the target DU, where at least one of network slices to which a cell provided by the target DU belongs is a network slice supported by the terminal; otherwise, after the terminal is switched to the target DU, if none of the network slices to which the cell on the target DU belongs is a network slice supported by the terminal, the terminal may fail to be switched.

In an optional embodiment of the present application, the network slice information includes at least one of: single network slice selection assistance information (S-NSSAI), network slice selection assistance information (S-NSSAI) or a network slice type (ST). After the network slice is configured by the above-mentioned method, the resources are subsequently allocated to the terminal according to the cell, thereby effectively improving mobility management capability of the terminal.

In an optional embodiment of the present application, a network slice to which a data radio bearer (DRB) of the terminal belongs and a network slice to which a data connection session (power distribution unit (PDU) session) corresponding to the data radio bearer belongs are one same network slice. By this way, a second network element (such as a DU) may allocate resources according to a resource condition of a network slice to which the DRB of the terminal belongs, thereby improving accuracy of resource allocation and ensuring isolation of the resources among network slices.

In an embodiment of the present application, when the first network element sends information of a TA to which a cell belongs to the second network element, a specific format of the information of the TA to which the cell belongs, that is, a correspondence between information of the cell and the information of the TA, may be sent in one of two forms described below.

In a first form, the first network element sends information of a TA and information of a cell which belongs to the TA (such as a list of cells which belong to the TA) to the second network element, as shown in Table 1.

TABLE 1

| | |
|---|---|
| TA 1 | Cell 1, Cell 2, . . . , Cell A |
| TA 2 | Cell 1, Cell 2, . . . , Cell B |
| . . . | . . . |
| TA N | Cell 1, Cell 2, . . . , Cell M |

In a second form, the first network element sends information of a cell and information of a TA to which the cell belongs to the second network element, as shown in Table 2.

TABLE 2

| | |
|---|---|
| Cell 1 | TA 1 |
| Cell 2 | TA 2 |
| . . . | . . . |
| Cell P | TA P |

In an embodiment of the present application, when the first network element sends information of a network slice to which a cell belongs to the second network element, a specific format of the information of the network slice to which the cell belongs, that is, a correspondence between information of the cell and the information of the network slice, may be sent in one of two forms described below.

In a first form, the first network element sends information of a network slice and information of a cell which belongs to the network slice (such as a list of cells which belong to the network slice) to the second network element, as shown in Table 3.

TABLE 3

| | |
|---|---|
| Network slice 1 | Cell 1, Cell 2, . . . , Cell A |
| Network slice 2 | Cell 1, Cell 2, . . . , Cell B |
| . . . | . . . |
| Network slice N | Cell 1, Cell 2, . . . , Cell M |

In a second form, the first network element sends information of a cell and information of a network slice to which the cell belongs to the second network element, as shown in Table 4.

TABLE 4

| | |
|---|---|
| Cell 1 | Network slice 1 |
| Cell 2 | Network slice 2 |
| . . . | . . . |
| Cell P | Network slice P |

In an embodiment of the present application, when the first network element sends information of a network slice to which a DRB of a terminal belongs to the second network element, a specific format of information of the network slice to which the DRB of the terminal belongs, that is, a correspondence between information of the DRB of the terminal and the information of the network slice, may be sent in one of two forms described below.

In a first form, the first network element sends information of a network slice and information of a DRB which belongs to the network slice (such as a list of DRBs which belong to the network slice) to the second network element, as shown in Table 5.

TABLE 5

| Network slice 1 | DRB 1, DRB 2, . . . , DRB A |
| Network slice 2 | DRB 1, DRB 2, . . . , DRB B |
| . . . | . . . |
| Network slice N | DRB 1, DRB 2, . . . , DRB M |

In a second form, the first network element sends information of a DRB and information of a network slice to which the DRB belongs to the second network element, as shown in Table 6.

TABLE 6

| DRB 1 | Network slice 1 |
| DRB 2 | Network slice 2 |
| . . . | . . . |
| DRB P | Network slice P |

In an optional embodiment of the present application, the method further includes steps described below.

In step 401, the first network element acquires the network slice configuration information.

In an embodiment of the present application, when the network slice configuration information is information of a network slice to which a DRB of a terminal belongs on the DU, the information of the network slice to which the DRB of the terminal may be determined according to a mapping relationship between the DRB and a data connection session and information of a network slice to which the data connection session belongs.

As an example, since the network slice to which the DRB of the terminal belongs and a network slice to which the data connection session corresponding to the DRB belongs are one same network slice, the network slice to which the DRB of the terminal belongs is the network slice to which the data connection session corresponding to the DRB belongs.

In an embodiment of the application, when the network slice configuration information is the information of the network slice to which the cell belongs, the information of the network slice to which the cell belongs may be determined according to information of a TA to which the cell belongs and information of a network slice supported by the TA, which are configured through network management. That is, the information of the network slice to which the cell belongs is the information of the network slice supported by the TA to which the cell belongs.

In the present embodiment, the first network element and the second network element may be any network elements, for example, the first network element is a DU, and the second network element is a CU; or, the first network element is a CU, and the second network element is a DU.

Figure 5:
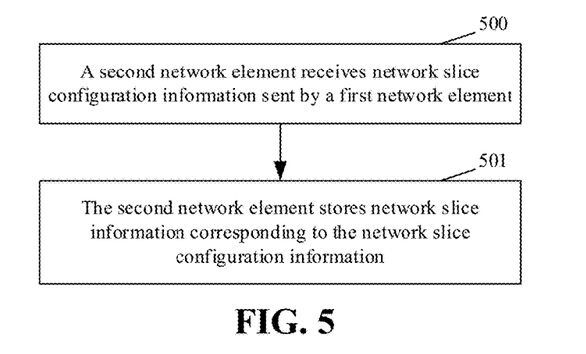
FIG. 5 is a flowchart of a network slice configuration method at a second network element side according to an embodiment of the present application.

Referring to FIG. 5, an embodiment of the present application further provides a network slice configuration method. The method includes steps described below.

In step 500, a second network element receives slice configuration information sent by a first network element.

In an embodiment of the present application, the network slice configuration information includes at least one of: network slice information, information of a network slice to which a cell belongs, information of a network slice to which a DRB of a terminal belongs, information of a TA to which a cell belongs, or information of a network slice supported by a TA.

In an embodiment of the present application, the network slice information includes at least one of: S-NSSAI, S-NSSAI or a network ST.

In an optional embodiment of the present application, a network slice to which a DRB of a terminal belongs and a network slice to which a data connection session corresponding to the DRB belongs are one same network slice. In this way, the second network element (such as a DU) may allocate resources according to a resource condition of the network slice to which the DRB of the terminal belongs, thereby improving accuracy of resource allocation and ensuring the isolation of resources between network slices. If the first network element does not know to which network slice the DRB of the terminal belongs, it is possible to assign a function of another network slice to the DRB of the terminal.

In step 501, the second network element stores network slice information corresponding to the network slice configuration information.

In an embodiment of the present application, when the network slice configuration information includes information of a TA to which a cell belongs, information of a network slice to which the cell belongs is determined according to the information of the TA to which the cell belongs and information of a network slice supported by the TA, and the information of the network slice to which the cell belongs is stored in information of the cell or information of a network slice supported by the second network element.

The information of the network slice to which the cell belongs is the information of the network slice supported by the TA to which the cell belongs.

When the network slice configuration information includes the information of the network slice to which the cell belongs, the second network element stores the information of the network slice to which the cell belongs into the information of the cell or the information of the network slice supported by the second network element.

When the network slice configuration information includes the information of the network slice to which the DRB of the terminal belongs, the second network element stores the network slice configuration information into a context of the terminal.

In the present embodiment, the first network element and the second network element may be any network elements, for example, the first network element is a DU, and the second network element is a CU; or, the first network element is a CU, and the second network element is a DU.

The embodiment of the present application implements configuration of a network slice through a manner of a first network element sending network slice configuration information to a second network element, so that a service is provided for the terminal.

A specific implementation of the above method will be described in detail through specific optional embodiments in conjunction with FIG. 1 to FIG. 3.

First Embodiment

Figure 6:
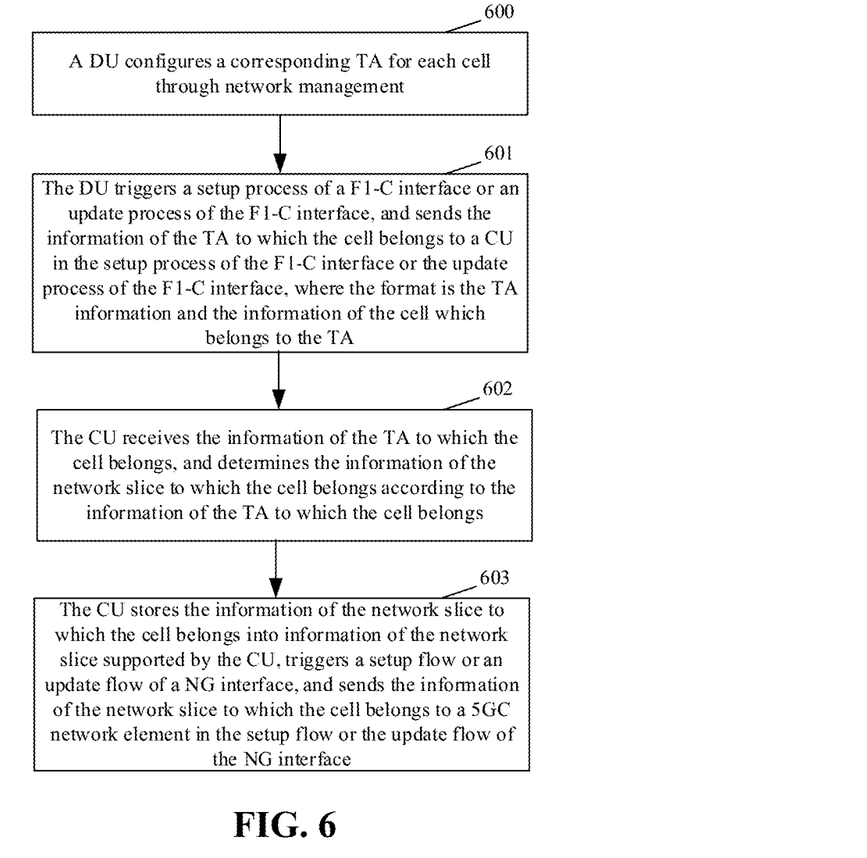
FIG. 6 is a flowchart of a network slice configuration method according to a first embodiment of the present application.

In the present embodiment, a DU sends information of a TA to which a DU side cell belongs to a CU, and a format of the information of the TA to which the cell belongs is the information of the TA and information of a cell which belongs the TA.

Referring to FIG. 6, the method includes steps described below

In step 600, the DU configures a corresponding TA for each cell through network management.

In step 601, the DU triggers a setup process of a F1-C interface or an update process of the F1-C interface, and sends the information of the TA to which the cell belongs to the CU in the setup process of the F1-C interface or the update process of the F1-C interface, where the format is the TA information and the information of the cell which belongs to the TA.

In this step, the DU may carry the information of the TA to which the cell belongs in a message such as a F1 SETUP REQUEST message of the F1 interface and/or a GNB-DU CONFIGURATION UPDATE message, and send the message to the CU. For example, each TA information in the SETUP REQUEST message carries the information of the cell which belong to the TA.

In this step, the information of the network slice supported by the TA may also be sent to the CU.

In step 602, the CU receives the information of the TA to which the cell belongs, and determines the information of the network slice to which the cell belongs according to the information of the TA to which the cell belongs.

In this step, since the CU and the DU learns the network slice supported by the TA through configuration, or the CU receives the information of the network slice supported by the TA, the CU may indirectly acquire the information of the network slice to which a cell on the DU side belongs according to the received TA information and the information of the cell which belongs to the TA.

As an example, the network slice to which the cell belongs is a network slice supported by the TA to which the cell belongs.

In step 603, the CU stores the information of the network slice to which the cell belongs into information of the network slice supported by the CU, triggers a setup flow or an update flow of a NG interface, and sends the information of the network slice to which the cell belongs to a 5GC network element in the setup flow or the update flow of the NG interface.

Second Embodiment

Figure 7:
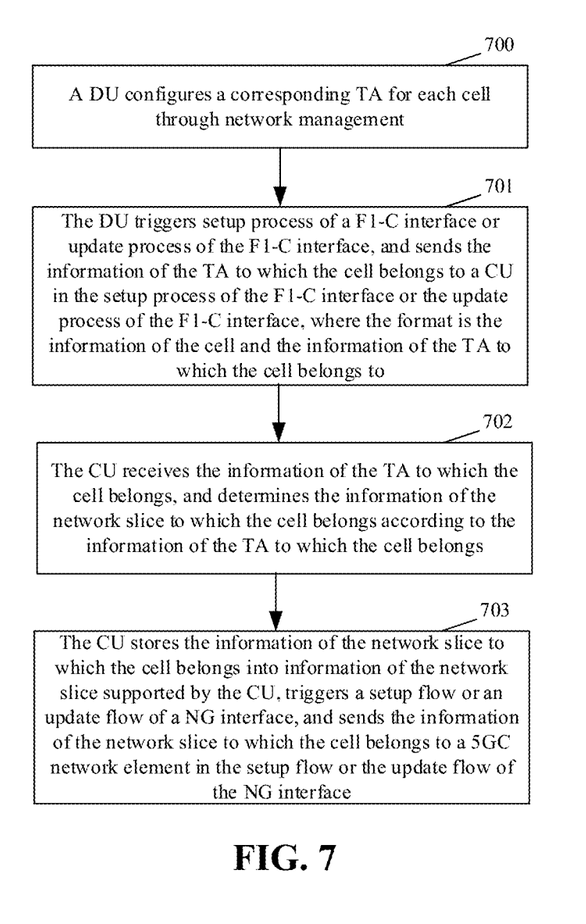
FIG. 7 is a flowchart of a network slice configuration method according to a second embodiment of the present application.

In the present embodiment, a DU sends information of a TA to which a DU side cell belongs to a CU, and a format of the information of the TA to which the cell belongs is information of the cell and information of the TA to which the cell belongs.

Referring to FIG. 7, the method includes steps described below

In step 700, the DU configures a corresponding TA for each cell through network management.

In step 701, the DU triggers setup process of a F1-C interface or update process of the F1-C interface, and sends the information of the TA to which the cell belongs to the CU in the setup process of the F1-C interface or the update process of the F1-C interface, where the format is the information of the cell and the information of the TA to which the cell belongs to.

In this step, the DU may carry the information of the TA to which the cell belongs in a message such as a F1 SETUP REQUEST message and/or a GNB-DU CONFIGURATION UPDATE message, and send the message to the CU. For example, a Served Cell Information field of the F1 SETUP REQUEST message carries the information of the TA to which the cell belongs.

In an embodiment, the information of the network slice supported by the TA may also be sent to the CU.

In step 702, the CU receives the information of the TA to which the cell belongs, and determines the information of the network slice to which the cell belongs according to the information of the TA to which the cell belongs.

In this step, since the CU and the DU learns the network slice supported by the TA through configuration, or the CU receives the information of the network slice supported by the TA, the CU may indirectly acquire the information of the network slice to which a cell on the DU side belongs according to the received TA information and the information of the cell which belongs to the TA.

Specifically, the network slice to which the cell belongs is a network slice supported by the TA to which the cell belongs.

In step 703, the CU stores the information of the network slice to which the cell belongs into information of the network slice supported by the CU, triggers a setup flow or an update flow of a NG interface, and sends the information of the network slice to which the cell belongs to a 5GC network element in the setup flow or the update flow of the NG interface.

Third Embodiment

Figure 8:
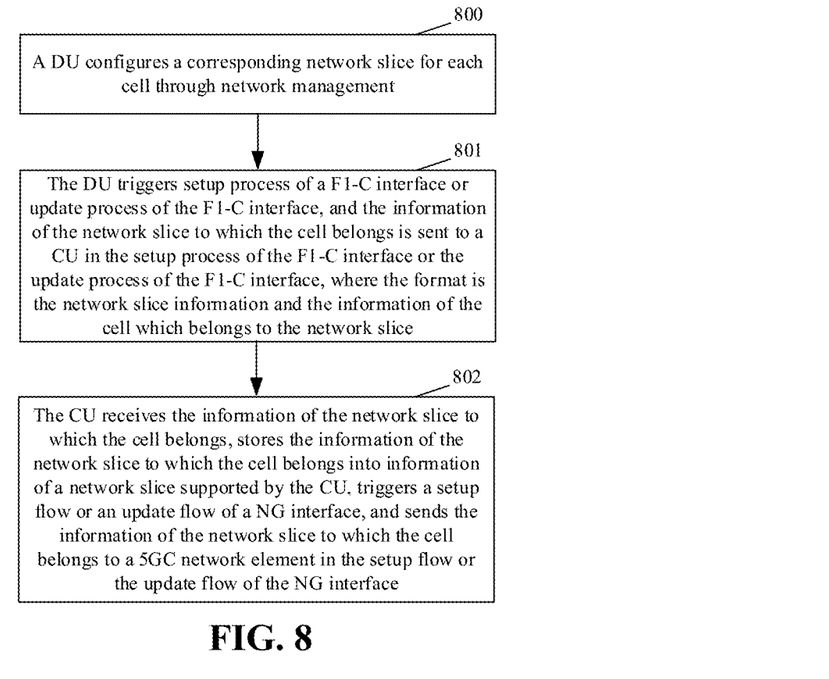
FIG. 8 is a flowchart of a network slice configuration method according to a third embodiment of the present application.

In the present embodiment, a DU sends information of a network slice to which a DU side cell belongs to a CU, and a format of the information of the network slice to which the cell belongs is the network slice information and information of a cell which belongs the network slice.

Referring to FIG. 8, the method includes steps described below

In step 800, the DU configures a corresponding network slice for each cell through network management.

In step 801, the DU triggers setup process of a F1-C interface or update process of the F1-C interface, and sends the information of the network slice to which the cell belong to the CU in the setup process of the F1-C interface or the update process of the F1-C interface, where the format is the network slice information and the information of the cell which belongs to the network slice.

In this step, the DU may carry the information of the network slice to which the cell belongs in a message such as a F1 SETUP REQUEST message and/or a GNB-DU CONFIGURATION UPDATE message, and send the message to the CU. For example, a network slice information field of the SETUP REQUEST message carries the information of the cell which belong to the network slice.

In step 802, the CU receives the information of the network slice to which the cell belongs, stores the information of the network slice to which the cell belongs into information of a network slice supported by the CU, triggers a setup flow or an update flow of a NG interface, and sends the information of the network slice to which the cell belongs to a 5GC network element in the setup flow or the update flow of the NG interface.

Fourth Embodiment

Figure 9:
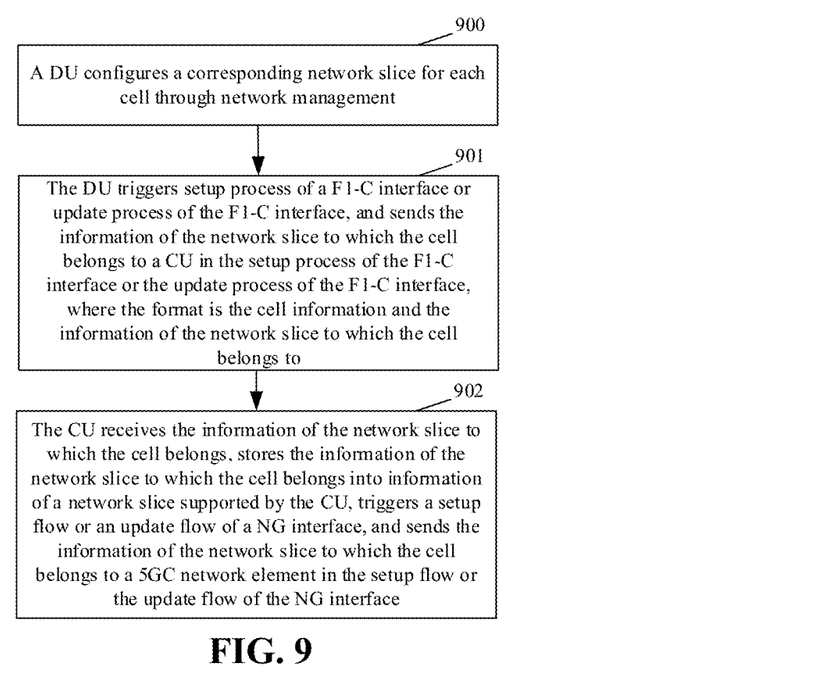
FIG. 9 is a flowchart of a network slice configuration method according to a fourth embodiment of the present application.

In the present embodiment, a DU sends information of a network slice to which a DU side cell belongs to a CU, and a format of the information of the network slice to which the cell belongs is cell information and the information of the network slice to which the cell belongs.

Referring to FIG. 9, the method includes steps described below

In step 900, the DU configures a corresponding network slice for each cell through network management.

In step 901, the DU triggers setup process of a F1-C interface or update process of the F1-C interface, and sends the information of the network slice to which the cell belongs to the CU in the setup process of the F1-C interface or the update process of the F1-C interface, where the format is the cell information and the information of the network slice to which the cell belongs to.

In this step, the DU may carry the information of the network slice to which the cell belongs in a message such as a F1 SETUP REQUEST message and/or a GNB-DU CONFIGURATION UPDATE message, and send the message to the CU.

As an example, the information of the network slice to which the cell belongs is carried in a Served Cell Information field of the F1 SETUP REQUEST message.

In step 902, the CU receives the information of the network slice to which the cell belongs, stores the information of the network slice to which the cell belongs into information of a network slice supported by the CU, triggers a setup flow or an update flow of a NG interface, and sends the information of the network slice to which the cell belongs to a 5GC network element in the setup flow or the update flow of the NG interface.

Fifth Embodiment

Figure 10:
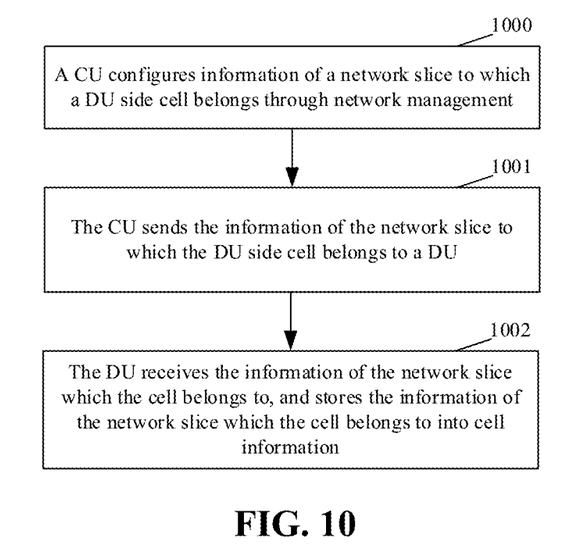
FIG. 10 is a flowchart of a network slice configuration method according to a fifth embodiment of the present application.

In the present embodiment, a CU sends information of a network slice to which a DU side cell belongs to a DU.

Referring to FIG. 10, the method includes steps described below

In step 1000, the CU configures the information of the network slice to which the DU side cell belongs through network management.

In step 1001, the CU sends the information of the network slice to which the DU side cell belongs to the DU.

In this step, the CU may send the information of the network slice to which the DU side cell belongs to the DU through an F1-C interface setup response message or an F1-C interface update configuration message (gNB-CU configuration Update). For example, the CU may carry the information of the network slice to which the DU side cell belongs in a Cells to be Activated List Item field in the F1-C interface setup response message.

Figure 11:
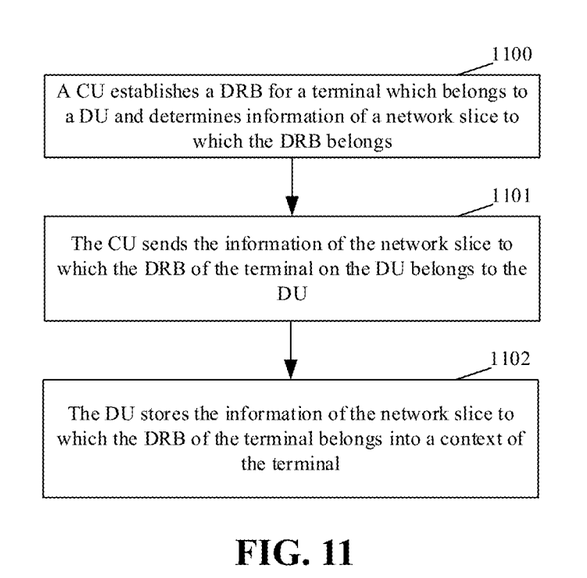
FIG. 11 is a flowchart of a network slice configuration method according to a sixth embodiment of the present application.

In step 1002, The DU receives information of a network slice which a cell belongs to, and stores the information of the network slice which the cell belongs to into cell information Sixth Embodiment In the present embodiment, a CU sends information of a network slice to which a DRB of a terminal on a DU belongs to the DU.

Referring to FIG. 11, the method includes steps described below.

In step 1100, the CU establishes a DRB for a terminal which belongs to the DU and determines the information of the network slice to which the DRB belongs.

In this step, for example, when the CU receives a PDU SESSION RESOURCE SETUP REQUEST message from a 5GC, the CU maps a data connection session to a DRB needed to be established on the DU. Because the network slice to which a PDU session belongs and the network slice to which the DRB belongs must be consistent, the CU configures the network slice to which the PDU session belongs to the DRB needed to be established on the DU in a process of establishing the DRB.

In step 1101, the CU sends the information of the network slice to which the DRB of the terminal on the DU belongs to the DU.

In this step, the CU may send the information of the network slice to which the DRB belongs to the DU through a message such as a UE CONTEXT SETEUP REQUEST message in a UE Context Setup flow or a UE CONTEXT MODIFICATION REQUEST message in a UE Context Modification flow. For example, the information of the network slice to which the DRB belongs may be carried in a DRB to Be SETUP Item IEs field of the UE CONTEXT SETUP REQUEST message.

In step 1102, the DU stores the information of the network slice to which the DRB of the terminal belongs into a context of the terminal.

Figure 12:
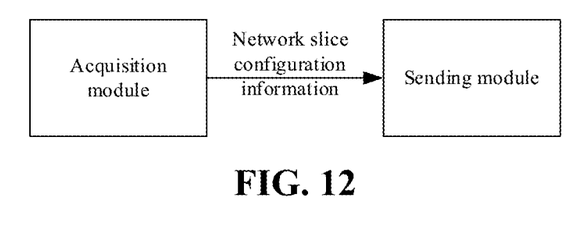
FIG. 12 is a structural diagram of a first network element according to an embodiment of the present application.

Referring to FIG. 12, an embodiment of the present application provides a first network element. The first network element includes a sending module. The sending module is configured to send network slice configuration information to a second network element so that the second network element stores network slice information corresponding to the network slice configuration information.

In an embodiment, the first network element further includes an acquisition module. The acquisition module is configured to acquire the network slice configuration information.

In an embodiment, the network slice configuration information includes at least one of: network slice information, information of a network slice to which a cell belongs, information of a network slice to which a DRB of a terminal belongs, information of a TA to which a cell belongs, or information of a network slice supported by a TA.

In an embodiment, the network slice information includes at least one of: S-NSSAI, S-NSSAI or a network ST.

In an embodiment, a network slice to which a DRB of a terminal belongs and a network slice to which a data connection session corresponding to the DRB belongs are one same network slice.

Figure 13:
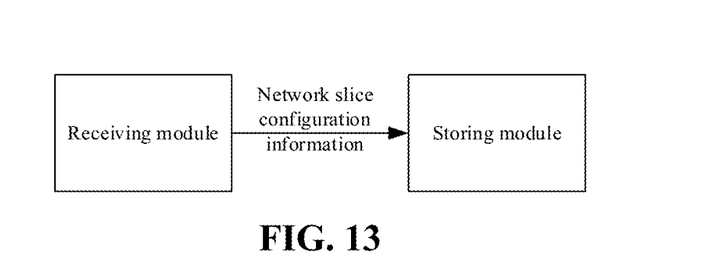
FIG. 13 is a structural diagram of a second network element according to an embodiment of the present application.

An embodiments of the present application further provides a second network element. The second network element includes a receiving module and a storing module.

The receiving module is configured to receive network slice configuration information of a first network element; and the storing module is configured to store network slice information corresponding to the network slice configuration information.

In an embodiment, the network slice configuration information includes at least one of: network slice information, information of a network slice to which a cell belongs, information of a network slice to which a DRB of a terminal belongs, information of a TA to which a cell belongs, or information of a network slice supported by a TA.

In an embodiment, the network slice information includes at least one of: S-NSSAI, S-NSSAI or a network ST.

In an embodiment, a network slice to which a DRB of a terminal belongs and a network slice to which a data connection session corresponding to the DRB belongs are one same network slice.

In an embodiment, the network slice configuration information includes information of a TA to which a cell belongs.

The storing module is configured to: determine the information of the network slice to which the cell belongs according to the information of the TA to which the cell belongs and information of a network slice supported by the TA, and store the information of the network slice to which the cell belongs into cell information or information of a network slice supported by the second network element.

In an embodiment, the network slice configuration information includes information of a network slice to which a cell belongs.

The storing module is configured to store the information of the network slice to which the cell belongs into the cell information or the information of the network slice supported by the second network element.

In an embodiment, the network slice configuration information includes information of a network slice to which a DRB of a terminal belongs.

The storing module is configured to store the network slice configuration information into a context of the terminal.

Figure 14:
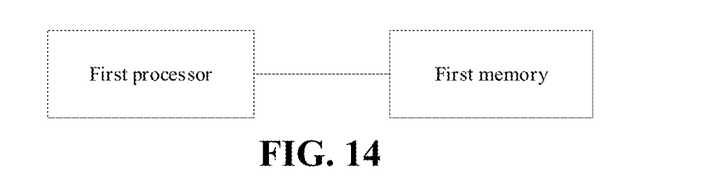
FIG. 14 is a structural diagram of another first network element according to an embodiment of the present application.

Referring to FIG. 14, an embodiment of the present application provides a first network element. The first network element includes a first processor and a first memory for storing a computer program executable on the first processor, where the first processor is configured to execute the computer program to perform the steps of a network slice configuration method applied to the first network element according to the embodiment of the present application.

Figure 15:
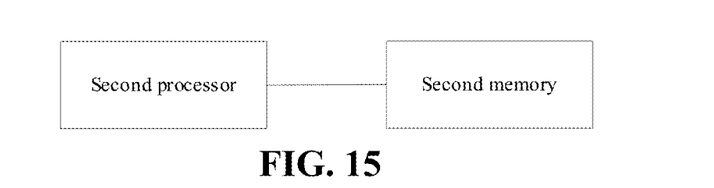
FIG. 15 is a structural diagram of another second network element according to an embodiment of the present application.

Referring to FIG. 15, embodiments of the present application provide a second network element. The second network element includes a second processor and a second memory for storing a computer program executable on the second processor, where the second processor is configured to execute the computer program to perform the steps of the network slice configuration method applied to the second network element according to the embodiment of the present application.

An embodiment of the present application further provide a computer-readable storage medium. The computer-readable storage medium is configured to store a computer program that, when executed by a processor, implements the steps of the network slice configuration method applied in the first network element or the second network element.

It should be understood that a memory (a first memory and/or a second memory) may be either a volatile memory or a non-volatile memory, and may include both the volatile memory and the non-volatile memory. The non-volatile memory may be a read only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, an optical disk or a compact disc read-only memory (CD-ROM). The magnetic surface memory may be a magnetic disc memory or a magnetic tape memory. The volatile memory may be a random access memory (RAM), which serves as an external high-speed cache. By way of illustration but not limitation, many forms of RAMs may be used, such as a static random access memory (SRAM), a synchronous static random access memory (SSRAM), a dynamic random access memory (DRAM), a synchronous dynamical random access memory (SDRAM), a double data rate synchronous dynamic random access memory (DDRSDRAM), an enhanced synchronous dynamic random access memory (ESDRAM), a syncLink dynamic random access memory (SLDRAM), and a direct rambus random access memory (DRRAM). The memory described in the embodiments of the present disclosure is intended to include, but is not limited to, these and any other suitable type of memory.

The methods disclosed by the embodiments of the present disclosure may be applied to the processor or may be implemented by the processor. The processor may be an integrated circuit chip with signal processing capabilities. In the implementation process, various steps of the methods described above may be performed by an integrated logic circuit of hardware or a software instruction in the processor. The processor described above may be a general-purpose processor, a digital signal processor (DSP), or another programmable logic device, another separate gate or transistor logic device, another separate hardware component, or the like. The processor may implement or execute various methods, steps and logic block diagrams disclosed in the embodiments of the present disclosure. The general-purpose processor may be a microprocessor or any conventional processor. The steps of the methods disclosed in the embodiments of the present disclosure may be directly implemented by a hardware decoding processor, or may be implemented by a combination of hardware and software modules in the decoding processor. The software module may be disposed in a storage medium disposed in the memory. The processor reads information in the memory and implements the steps of the methods described above in combination with hardware of the processor.

It should be understood that, the first network element in the embodiments of the present application may further include a first communication module. The first communication module is configured to send information, such as network slice configuration information.

It should be understood that, the second network element in the embodiments of the present application may further include a second communication module. The second communication module is configured to send information, such as network slice configuration information.

It should be understood that the devices and the methods disclosed in the embodiments of the present application may be implemented in other ways. The device embodiments described above are merely illustrative. For example, the unit division is merely a logical function division, and, in practice, the unit division may be implemented in other ways. For example, multiple units or components may be combined or may be integrated into another system, or some features may be omitted or not executed. In addition, coupling, direct coupling or communication connections between the presented or discussed components may be indirect coupling or communication connections, via interfaces, between devices or units, and may be electrical, mechanical or in other forms.

The units described above as separate components may or may not be physically separated. Components presented as units may or may not be physical units, that is, may be located in one place or may be distributed over multiple network units. Part or all of these units may be selected according to practical requirements to achieve objects of the solutions in the present embodiment.

Moreover, various function units in the embodiments of the present disclosure may all be integrated in one processing unit, or each unit may be used as a separate unit, or two or more units may be integrated into one unit. The integrated function unit may be implemented by hardware or may be implemented by hardware plus a software function unit.

It can be understood by those skilled in the art that all or part of the steps in the method embodiments described above may be implemented by hardware related to program instructions, these programs may be stored in a computer-readable storage medium, and, when executed, these programs execute steps including the method embodiments described above. The preceding storage medium includes various media capable of storing program codes, such as a removable storage device, a ROM, a RAM, a magnetic disk or an optical disk.

Alternatively, the above-mentioned integrated unit of the present disclosure may also be stored in the computer-readable storage medium if implemented in the form of a software function module and sold or used as an independent product. Based on this understanding, the technical solutions provided by the embodiments of the present disclosure substantially, or the part contributing to the existing art, may be embodied in the form of a software product. The computer software product is stored in a storage medium and includes several instructions for enabling a computer apparatus (which may be a personal computer, a server or a network apparatus, etc.) to execute all or part of the methods provided by the embodiments of the present disclosure. The preceding storage medium includes various media capable of storing program codes, such as a removable storage device, a ROM, a magnetic disk or an optical disk.

The above are only specific embodiments of the present disclosure and are not intended to limit the present disclosure. It is easy for those skilled in the art to conceive modifications or substitutions within the technical scope of the present disclosure. These modifications or substitutions are within the scope of the present disclosure. Therefore, the protection scope of the present disclosure is subject to the scope of the appended claims.

We claim:

1. A network slice configuration method, comprising:
sending, by a distributed unit of a base station, network slice configuration information to a centralized unit of the base station, so that the centralized unit of the base station stores network slice information corresponding to the network slice configuration information,
wherein the network slice configuration information comprises information of a network slice supported by a tracing area, TA,
wherein the information of the network slice supported by the TA is sent by the distributed unit of the base station to the centralized unit of the base station in a Served Cell Information field of a F1 SETUP REQUEST message or a GNB-DU CONFIGURATION UPDATE message.

2. The network slice configuration method of claim 1, wherein the network slice configuration information comprises:
information of a network slice to which a data radio bearer of a terminal belongs.

3. The network slice configuration method of claim 1, wherein the information of a network slice supported by a TA is a network slice supported by the TA to which a cell belongs.

4. The network slice configuration method of claim 1, wherein the network slice information comprises single network slice selection assistance information, S-NSSAI.

5. A network slice configuration method, comprising:
receiving, by a centralized unit of a base station, network slice configuration information of a distributed unit of the base station; and
storing, by the centralized unit of the base station, network slice information corresponding to the network slice configuration information,
wherein the network slice configuration information comprises information of a network slice supported by a tracing area, TA,
wherein the information of the network slice supported by the TA is received by the centralized unit of the base station from the distributed unit of the base station in a Served Cell Information field of a F1 SETUP REQUEST message or a GNB-DU CONFIGURATION UPDATE message.

6. The network slice configuration method of claim 5, wherein the network slice configuration information comprises information of a network slice to which a data radio bearer of a terminal belongs.

7. The network slice configuration method of claim 5, wherein the information of a network slice supported by a TA is a network slice supported by the TA to which a cell belongs.

8. The network slice configuration method of claim 5, wherein the network slice information comprises single network slice selection assistance information, S-NSSAI.

9. A distributed unit of a base station, comprising:
a processor, which is configured to send via a transmitter, network slice configuration information to a centralized unit of the base station so that the centralized unit of the base station stores network slice information corresponding to the network slice configuration information,
wherein the network slice configuration information comprises information of a network slice supported by a tracing area, TA,
wherein the sending module is further configured to send information of the network slice supported by the TA to the centralized unit of the base station in a Served Cell Information field of a F1 SETUP REQUEST message or a GNB-DU CONFIGURATION UPDATE message.

10. The distributed unit of the base station of claim 9, wherein the network slice configuration information comprises:
information of a network slice to which a data radio bearer of a terminal belongs.

11. The distributed unit of the base station of claim 9, wherein the information of a network slice supported by a TA is a network slice supported by the TA to which a cell belongs.

12. The distributed unit of the base station of claim 9, wherein the network slice information comprises single network slice selection assistance information, S-NSSAI.

13. A centralized unit of a base station, comprising a processor configured to:
receive via a receiver, slice configuration information of a distributed unit of the base station; and
store network slice information corresponding to the network slice configuration information,
wherein the network slice configuration information comprises information of a network slice supported by a tracing area, TA,
wherein the receiving module is further configured to receive information of the network slice supported by the TA from the distributed unit of the base station in a Served Cell Information field of a F1 SETUP REQUEST message or a GNB-DU CONFIGURATION UPDATE message.

14. The centralized unit of the base station of claim 13, wherein the network slice configuration information comprises information of a network slice to which a data radio bearer of a terminal belongs.

15. The centralized unit of the base station of claim 13, wherein the information of a network slice supported by a TA is a network slice supported by the TA to which a cell belongs.

16. The centralized unit of the base station of claim 13, wherein the network slice information comprises single network slice selection assistance information, S-NSSAI.

* * * * *